United States Patent
Wang

(10) Patent No.: US 8,341,741 B2
(45) Date of Patent: Dec. 25, 2012

(54) INTRINSICALLY SAFE REMOTE DATA MONITORING SYSTEM AND MONITORING METHOD THEREOF

(76) Inventor: Jian Wang, Beijing (CN)

( * ) Notice: Subject to any disclaimer, the term of this patent is extended or adjusted under 35 U.S.C. 154(b) by 853 days.

(21) Appl. No.: 12/293,488

(22) PCT Filed: Feb. 14, 2007

(86) PCT No.: PCT/CN2007/000537
§ 371 (c)(1),
(2), (4) Date: Sep. 18, 2008

(87) PCT Pub. No.: WO2007/107077
PCT Pub. Date: Sep. 27, 2007

(65) Prior Publication Data
US 2009/0293124 A1    Nov. 26, 2009

(30) Foreign Application Priority Data
Mar. 20, 2006   (CN) .......................... 2006 1 0064971

(51) Int. Cl.
*H04L 29/06* (2006.01)

(52) U.S. Cl. ................. 726/23; 726/2; 726/22; 713/189

(58) Field of Classification Search ...................... 726/23
See application file for complete search history.

(56) References Cited

U.S. PATENT DOCUMENTS

| | | | | |
|---|---|---|---|---|
| 5,382,943 | A | * | 1/1995 | Tanaka ..................... 340/539.22 |
| 2002/0141618 | A1 | * | 10/2002 | Ciolli et al. .................. 382/104 |
| 2003/0189638 | A1 | * | 10/2003 | Fry ............................... 348/154 |
| 2004/0022443 | A1 | * | 2/2004 | Kuo ............................. 382/232 |
| 2005/0012823 | A1 | * | 1/2005 | Young ......................... 348/211.2 |

FOREIGN PATENT DOCUMENTS

| | | |
|---|---|---|
| CN | 1393801 A | 1/2003 |
| CN | 1437335 A | 8/2003 |
| CN | 2696216 Y | 4/2005 |

* cited by examiner

*Primary Examiner* — Edward Zee
*Assistant Examiner* — Yogesh Paliwal
(74) *Attorney, Agent, or Firm* — The Webb Law Firm

(57) ABSTRACT

This invention refers to an intrinsically safe remote data monitoring system and a monitoring method for remote data monitoring by using such system. The monitoring system comprises a process control computer that monitors or controls the controlled process, a remote monitoring computer that remotely monitors the process control computer, a signal collecting device physically connected, without through network, with the process control computer, for acquiring data from the process control computer, a local monitoring computer (4) connected with the signal collecting device. The local monitoring computer (4) is also connected with the remote monitoring computer through network. The monitoring method comprises following steps: the signal collecting device collecting data from the process control computer in the monitoring system, and then the local monitoring computer (4) transmitting the data signal to the remote monitoring computer for monitoring.

11 Claims, 5 Drawing Sheets

Picture of Manual

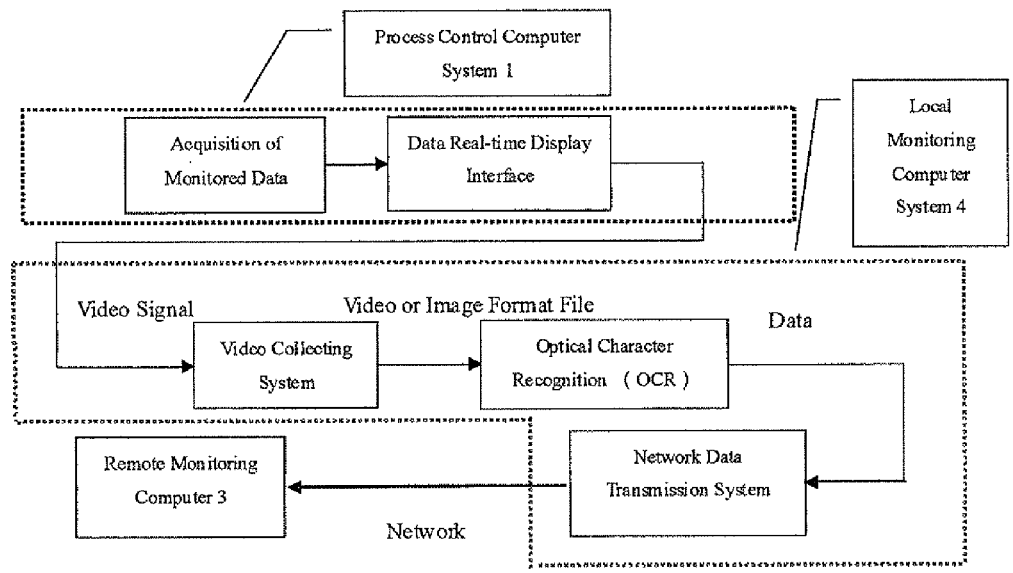
Figure 5
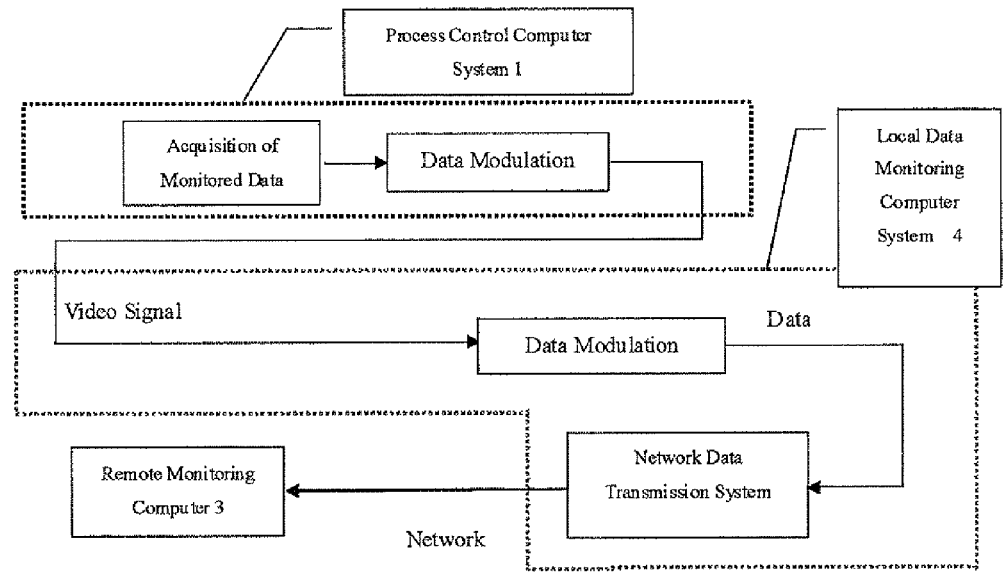
Figure 5.1

INTRINSICALLY SAFE REMOTE DATA MONITORING SYSTEM AND MONITORING METHOD THEREOF

FIELD OF INVENTION

The invention relates to the computer control technical filed, and particularly relates to an intrinsically safe remote data monitoring system and a remote data monitoring method performed by such system.

BACKGROUND OF THE INVENTION

Remote data monitoring in the existing industry control process is mostly realized by using the data network, such as Internet or LAN. No matter what the structure details of the remote data monitoring system is, its general connection way is shown in FIG. 1, that is, the system comprises a process control computer, an industry process controlled by the process control computer and a remote monitoring computer connected with the process control computer.

The remote monitoring system is characterized in that the process control computer is physically connected with the external network through network, and the physical connection may result in attack on the process control computer from the external network, such as hacker attack from network or virus invasion. Although protective measures like firewalls can be applied in the computer system, it is still impossible to guarantee absolute safety of the process control computer. Since the process control computer performs real-time industrial control or monitoring on the controlled industry process, once it is attacked, it may cause out-of-control of the controlled industry process so as to cause serious consequences.

SUMMARY OF THE INVENTION

The invention is made to solve the technical problem resulting from deficiencies of existing techniques mentioned above by providing an intrinsically safe remote data monitoring system, which can monitor the controlled industry process and also guarantee that the process control computer used for monitoring or controlling the controlled industry process is protected from attack from the external network, and a monitoring method performed by such system.

Technical solution for solving the technical problem of the invention is an intrinsically safe remote data monitoring system comprising a process control computer or computer system that monitors or controls the controlled industry process; a remote monitoring computer or computer system that remotely monitors the process control computer, and the intrinsically safe remote data monitoring system is characterized in that it further comprises a signal collecting device or system being physically connected with the process control computer or computer system, instead of through network, for acquiring a data signal from the process control computer or computer system; and a local monitoring computer or computer system connected with the signal collecting device or system. The local monitoring computer or computer system is connected with the remote monitoring computer or computer system through network. The local monitoring computer or computer system is connected with the remote monitoring computer or computer system through network such as Internet. The controlled process may be the controlled industry process or other systems for which one-way data transmission is required.

The method for remote data monitoring is that signal collecting device being physically connected with the process control computer or computer system in the monitoring system, instead of through network, acquires data signal from the process control computer, and then the local monitoring computer sends the data signal to the remote monitoring computer for monitoring.

An image or video collecting device can be used as the signal collecting device. The image or video collecting device is preferably a camera for shooting data video image shown on the display of the process control computer, or a video collecting device for acquiring video signal from the display of the process control computer.

The video collecting device for acquiring video signal from the display of the process control computer comprises a video splitter and a video capture card, one output of the video splitter is connected with the display of the process control computer and the other output is connected with the video capture card connected with the local monitoring computer.

There are several ways for transmitting data signal acquired by the image collecting device.

One way is that the local monitoring computer converts the acquired video signal of monitored data into a file in an image or video format, and then the local monitoring computer sends the file to the remote monitoring computer in a network file format.

The preferable way is that the image collecting device converts the acquired video signal of data into a file in an image or video format, reverts the file in the image or video format into data in the text format or the floating-point format, and then the local monitoring computer sends the data to the remote monitoring computer for monitoring through network data transmission. Conversion of the file in the image or video format is performed by recognizing characters and numbers through the optical character recognition technique OCR, so as to convert the file in the image or video format of data into data in the text format or floating-point format.

The non-network physical connection between the process control computer and the local monitoring computer in monitoring system of the invention can be implemented by other one-way data transmission methods besides by transmitting information by using the video signal. For example, by using a one-way photoelectric coupling unit, a light emitter of the unit sends data. A light receiver, a photoelectric conversion component, converts the light data signal from the light emitter into the electric data signal. The light emitter is connected with the process control computer and the light receiver is connected with the local monitoring computer, so as to form a structure that data is sent from the process control computer to the local monitoring computer only by the photoelectric one-way method.

Similar with the photoelectric coupling unit, radio can be adopted for the one-way transmission, a radio emitter is connected with the process control computer and a radio receiver is connected with the local monitoring computer to perform the data transmission. It is like radio or TV broadcast, in which data signal is sent to the local monitoring computer at monitoring side through radio or TV broadcast. Therefore, the radio receiver cannot influence the process control computer connected with the emitter.

For the remote data monitoring system in the existing technique, data signal transmission between the process control computer and the remote monitoring computer has to be realized through Internet. Although the anti-hacker software or hardware can be adopted for protection, since there are physical connection through network between the two computers, potential dangers still exist in the network. In contrast, for the monitoring system of the invention, data signal transmission between the process control computer and the remote monitoring computer is realized through non-network physical connection, therefore the data signal transmission between the process control computer and the remote monitoring computer is absolutely isolated from the external network, and the process control computer is protected from hacker and virus attack, consequently network safety of the process control computer is intrinsically guaranteed.

The monitoring system and the monitoring method of the invention are also applicable for general data transmission, for example, sending data from network A (such as LAN in a company) to network B through one-way method and meanwhile guaranteeing that network A will not be influenced by attack from network B.

The invention can be used for monitoring the controlled industry process and other network data transmission systems, or for one-way data transmission, the process control computer will not be attacked by hacker and virus from external network, substantially guaranteeing network safety of the process control computer.

DESCRIPTION OF DRAWINGS

FIG. 5 is a flow diagram in which data signal in FIG. 2 or 3 is performed in the other processing and transmission mode.

FIG. 5.1 is a flow diagram in which data transmission through video signal modulation and demodulation when the data signal in FIG. 2 or 3 is performed in the other processing and transmission mode.

Hereinto: 1—process control computer 2—controlled industry process 3—remote monitoring computer 4—local monitoring computer 5—camera 6—video collecting device 7—display

SPECIFIC WAY OF IMPLEMENTING

The invention is further described by combining with attached figures.

Figure 1:
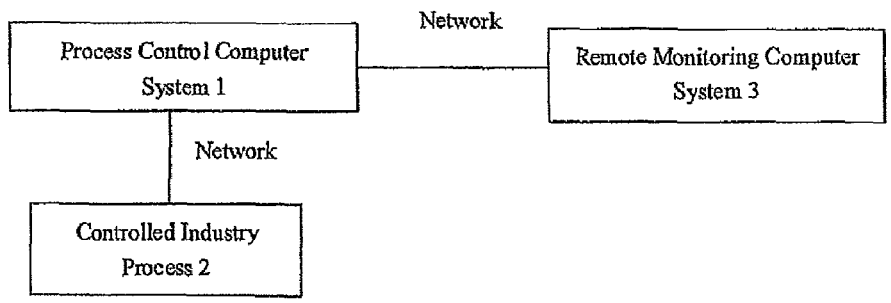
FIG. 1 is a structural diagram of a monitoring system in a controlled industry process of the existing technique.
Figure 2:
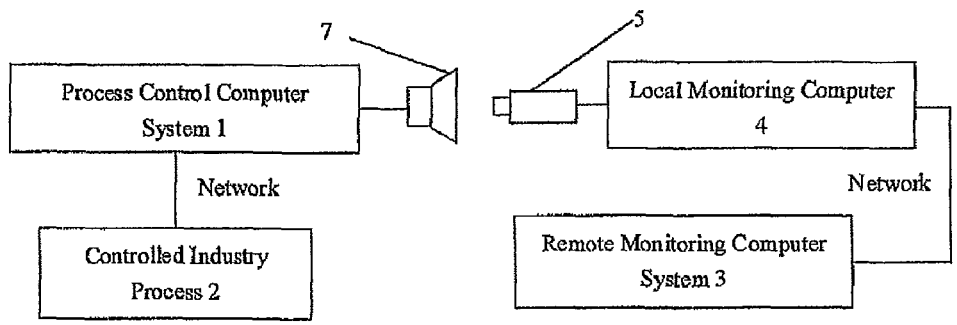
FIG. 2 is a structural diagram in which a camera is adopted for information acquisition device in the remote data monitoring system of the invention.
Figure 3:
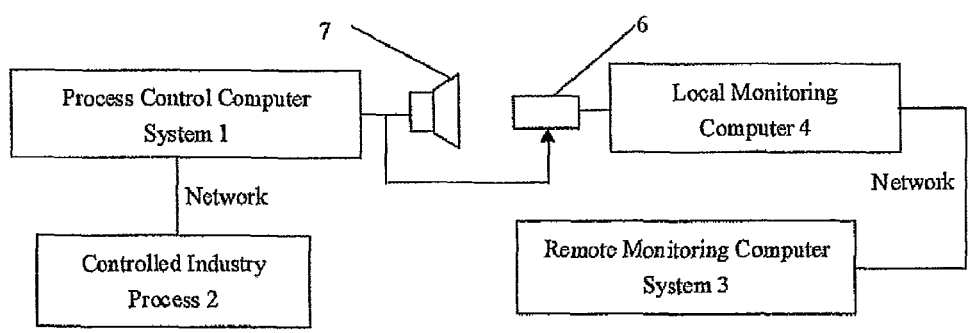
FIG. 3 is a structural diagram in which a video collecting device is used as the information collecting device in the remote data monitoring system of the invention.

As shown in FIGS. 2 and 3, an intrinsically safe remote data monitoring system in the invention comprises a process control computer 1 that monitors or controls the controlled industry process 2, a signal collecting device physically connected, without through network, with the process control computer 1, for acquiring a data signal from the process control computer 1, a local monitoring computer 4 being connected with the signal collecting device, and a remote monitoring computer 3 that remotely monitors the process control computer 1, wherein the local monitoring computer 4 is also connected with the remote monitoring computer 3 through Internet.

A camera 5 shown in FIG. 2 can be used as a signal collecting device. But in practice, the camera 5 has to aim at the display 7 of the process control computer 1 and cannot be moved, which results in a little inconvenient for use, therefore the video collecting device 6 shown in FIG. 3 can be selected for use as the signal collecting device.

As shown in FIGS. 2 and 3, the local monitoring computer 4 converts the video signal of monitored data, which is acquired by the image or video collecting device, into a file in an image or video format, and then the local monitoring computer 4 sends the monitored information to the remote monitoring computer 3 through network (such as Internet). Since there is not a physical network connection between the process control computer 1 and the network system consisting of the local monitoring computer 4 and the remote monitoring computer 3, it is impossible for the process control computer 1 to be attacked from any network, such as Internet, thereby the network safety of the process control computer 1 is substantially guaranteed.

Figure 4:
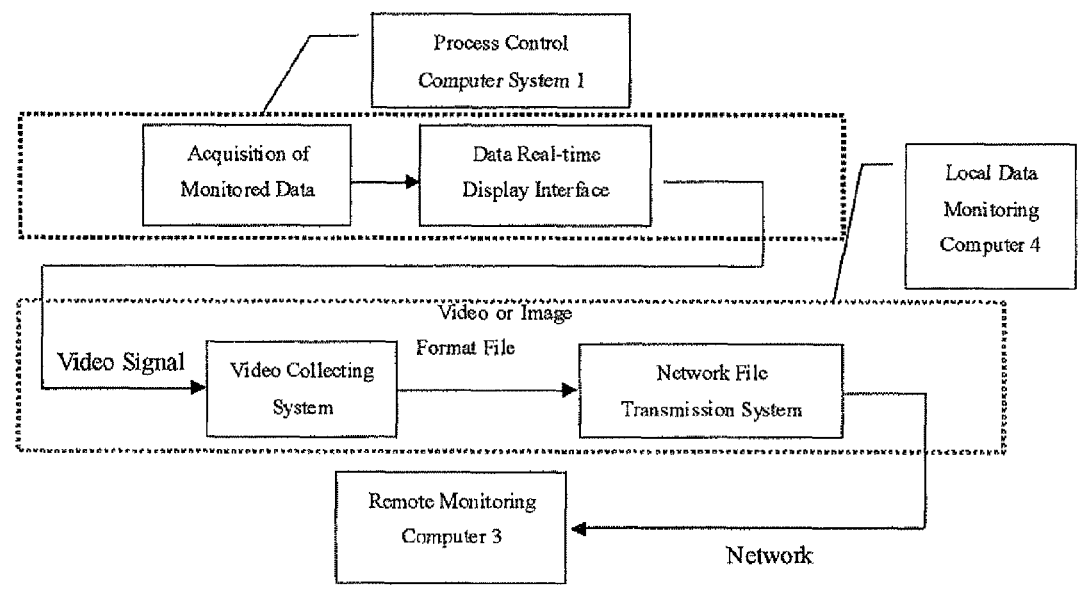
FIG. 4 is a flow diagram in which data signal in FIG. 2 or 3 is performed in one processing and transmission mode.

The local monitoring computer 4 has two processing and transmission modes for an image or video file of the video signal of the monitored data acquired by the camera 5 or the video collecting device 6, and these two modes are shown in FIGS. 4 and 5.

As shown in FIG. 4, the first information processing and transmission mode is to display the monitored data acquired by the process control computer 1 on the display 7, which is connected with the process control computer 1, through a data real-time display interface. The local monitoring computer 4 converts the video signal of the monitored data, acquired by the image collecting device (such as the camera 5 or the video collecting device 6), into an image or video format file (including stream format file), which is sent to the remote monitoring computer 3 through the Internet transmission system (i.e. local monitoring computer 4). This information processing and transmission mode is characterized in that the image or video file is remotely transmitted, and what can be seen in the remote monitoring computer 3 is the data image shown on the display 7, such transmission way needs wider remote transmission band and it is not convenient for data storage and processing.

As shown in FIG. 5, the second information processing and information transmission mode is to convert the video signal of data acquired by the image collecting device into an image or video format file in the local monitoring computer 4, and then converts the image or video file into text format data or floating-point format data, and then the network data transmission system (i.e. the local monitoring computer 4) sends the data to the remote monitoring computer 3 for monitoring. Conversion of the image or video file is performed by recognizing characters and numbers by means of optical character recognition technique OCR, consequently the image or video file of data is converted into text format data or floating-point format data. Such information processing and transmission mode is characterized in low demand for remote transmission band and simple data storage method.

For the second information processing and transmission mode, the monitored data acquired from the process control computer is required to be shown on the display 7 (see FIG. 3), there are several ways to show the data, for example, either directly showing the data in the form of floating-point number, or showing the data on the display through certain mapping transformation, and then reverse transformation is performed after finishing the optical character recognition, so as to revert into original data. For example, a decimal point of the data can be substituted by other characters, in order to avoid the situation that an OCR recognition program misidentifies the decimal point as polluted "dirty point" and refuses to recognize it, the substitute character (like character A) is reverted to decimal point only after the OCR recognition program recognizes it.

There are various kinds of mapping transformation, and the mapping transformation can be designed according to actual demand. For example, the acquired data can be expressed in 64-digit binary system or in binary system adopting other digits according to demand, and then correspond 64 pixels on a position in the display interface to 64 binary numbers, for each pixel, white color or RGB value for as specified color represents 1, black color or another RGB value for a specified color represents 0. The local monitoring computer gives binary expression of the data according to the color after acquiring the 64 pixels on that position, and then reverts this binary data to a normal decimal floating-point number.

For the second information processing and transmission mode, the monitored data acquired from the process control computer system can be directly modulated to a video signal, and the local monitoring computer demodulates the video signal to revert it to the original data after receiving it, as shown in FIG. 5.1.

For non-network physical connection between the process control computer and the local monitoring computer in monitoring system of the invention, other one-way data transmission methods can be adopted besides video signal for transmission, such as a one-way photoelectric coupling unit, in which a light emitter of the unit sends data, a light receiver, a photoelectric conversion component, converts the light data signal from the light emitter into the electric data signal. The light emitter is connected with the process control computer 1, the light receiver is connected with the local monitoring computer 4, so as to form a structure that data is sent from the process control computer 1 to the local monitoring computer 4 only by one-way photoelectric method, which is similar with the data signal transmission in FIG. 3, except for that the light emitter in FIG. 3 is a display and the light receiver in FIG. 3 is a camera. Similar with the photoelectric coupling unit, radio can also be adopted for one-way transmission. A radio emitter is connected with the process control computer 1 and a radio receiver is connected with the local monitoring computer 4 to transmit data, which is like radio or TV broadcast, the data signal is sent to the monitoring side through radio or TV broadcast. Therefore, it is impossible for the radio receiver to influence the process control computer connected with the emitter, consequently avoiding attack on process control computer 1 from network.

Figure 6:
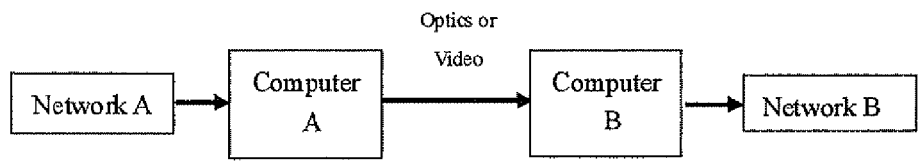
FIG. 6 shows a general mode for data transmission of the invention.

The monitoring system and the monitoring method of the invention are also applicable for transmitting general data. As shown in FIG. 6, if it is necessary to send data from network A (like LAN in a company) to network B through a one-way method and meanwhile guarantee that network A will not be influenced by attack from network B, the monitoring system and the monitoring method of the invention shall be used.

Following two embodiments are not intended to limit the invention.

Embodiment 1

Figure 7:
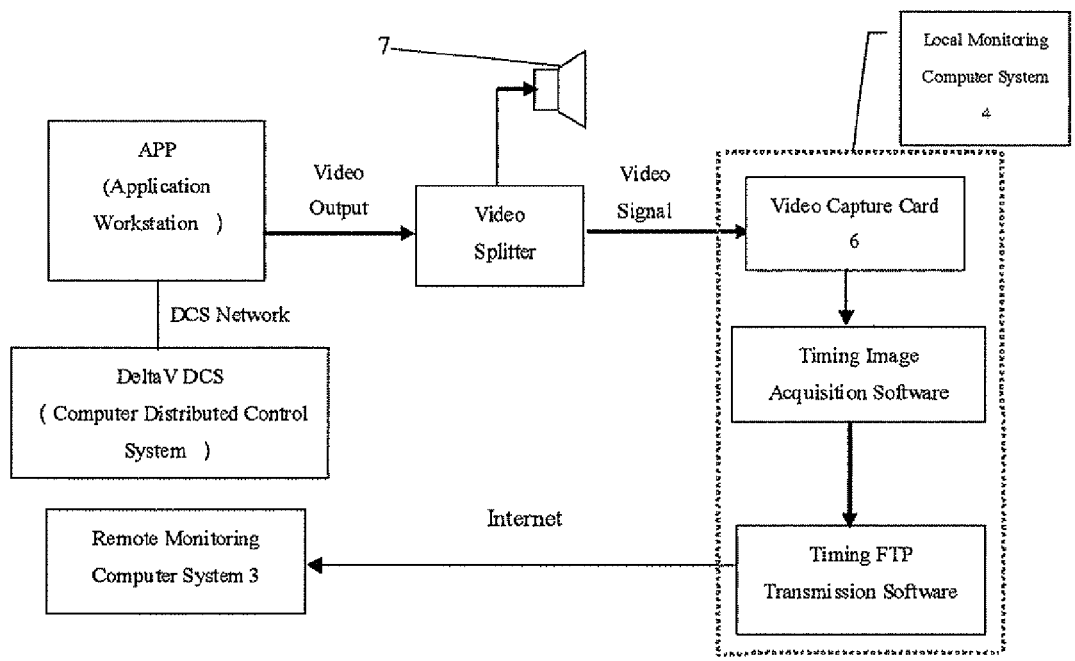
FIG. 7 is a structural diagram of embodiment 1 of the invention.

As shown in FIG. 7, this embodiment relates to a remote data monitoring system used in a real time optimization of fluid catalytic cracking process, and DeltaV computer distributed control system of Emerson is adopted in the process of production. A process control computer 1, that is, an APP computer (Application Workstation), on the control network of the monitoring system is used for monitoring and controlling the computer distributed control system, and the acquired data to be remotely monitored is displayed on the display of the APP computer. The APP computer is connected with a video collecting device 6, which comprises a video splitter and a video capture card. The video splitter is added to a video connection cable between the APP computer and the display. One output of the video splitter is connected with the display of the APP computer, and the video signal from the other output is input into the video capture card of the local monitoring computer system. A timing image collecting software and a timing FTP transmission software connected with it are installed in the local monitoring computer system, and the video capture card is installed in the local monitoring computer system. The video signal on the video splitter is collected and displayed on the local monitoring computer system. The timing image collecting software in the local monitoring computer system converts the video image in the video capture card into an image file every certain interval, and the timing FTP transmission software sends the image file to the remote monitoring computer 3 through the Internet file transmission system. Data to be monitored in the computer distributed control system is shown in the remote monitoring computer 3, and Internet between the remote monitoring computer 3 and the local monitoring computer system is physically disconnected with the computer distributed control system from the viewpoint of network. Therefore, it is impossible for virus or hacker from Internet to invade the computer distributed control system through such system and attack the industry process.

Embodiment 2

Figure 8:
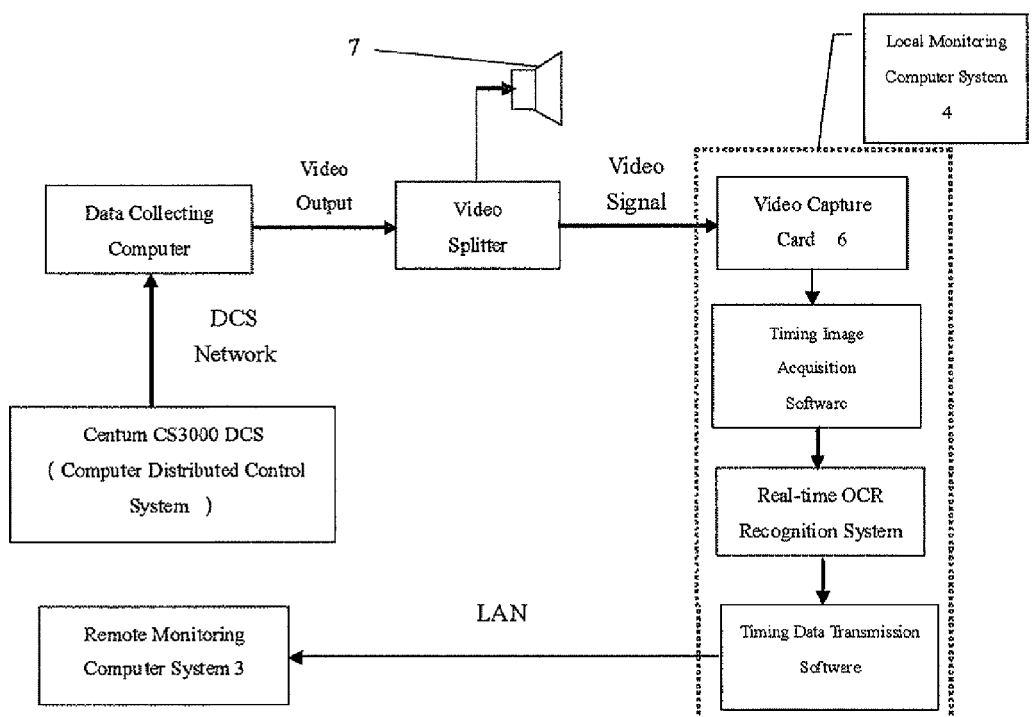
FIG. 8 is a structural diagram of embodiment 2 of the invention.

As shown in FIG. 8, this embodiment relates to a remote data monitoring system used in the process of certain chemical production, Centum CS3000 computer distributed control system of Yokogawa is adopted in the process of production. A data collecting computer on the control network of the monitoring system is used for acquiring monitored data from the computer distributed control system, and the acquired data to be remotely monitored is displayed on the display 7 of the data collecting computer. The data collecting computer is connected with the video collecting device, which comprises a video splitter and a video capture card 6. A video splitter is added to the video connection cable between the data collecting computer and the display. One output is connected with the display of the data collecting computers and the video signal from the other output is input into the video capture card of the local monitoring computer system. A timing image collecting software, an OCR real-time recognition system and a timing real-time transmission software are installed in the local monitoring computer system. The video capture card is installed in the local monitoring computer system. The video capture card acquires the video signal from video splitter, and the video signal is displayed in the local monitoring computer system. The timing image collecting software in the local monitoring computer system converts the video image in the video capture card into an image file every certain interval, and then the OCR real-time recognition system recognizes the image file and converts it into floating-point data. The timing data transmission software sends the floating-point data to a database of the remote monitoring computer 3 through LAN. Data to be monitored of the computer distributed control system is shown in the remote monitoring computer 3, and LAN is physically disconnected with the computer distributed control system from the viewpoint of network. Therefore, it is impossible for virus or hacker from LAN to invade the computer distributed control system through such system and attack the industry process.

The invention claimed is:

1. An intrinsically safe remote data monitoring system comprising: a process control computer or computer system that monitors or controls a controlled process, and a remote monitoring computer or computer system that remotely monitors the process control computer or computer system, wherein the intrinsically safe remote data monitoring system further comprises a signal collecting device or system physically connected via one-way transmission, without through network, with the process control computer or computer system, for acquiring a data signal from the process control computer or computer system, and a local monitoring computer or computer system connected with the signal collecting device or system, wherein said local monitoring computer or computer system is connected with the remote monitoring computer or computer system through network, said signal collecting device or system is an image or video collecting device, wherein the image or video collecting device converts the data signal into an image or video format file, then the image or video format file is converted into text format data or floating-point format data, and the local monitoring computer or computer system sends the text format data or floating-point format data to the remote monitoring computer or computer system for monitoring through a network data transmission system.

2. The intrinsically safe remote data monitoring system in claim 1, wherein the image or video collecting device is a camera for shooting a data video image shown on a display of the process control computer or computer system, or a video collecting device for acquiring the data signal from the display of the process control computer or computer system.

3. The intrinsically safe remote data monitoring system in claim 2, wherein the video collecting device for acquiring the data signal from the display of the process control computer or computer system comprises a video splitter and a video capture card, wherein one output of the video splitter is connected with the display of the process control computer or computer system and the other output is connected with the video capture card connected with the local monitoring computer or computer system.

4. A monitoring method for remotely monitoring data by using an intrinsically safe remote data monitoring system, wherein a signal collecting device or system physically connected via one-way transmission, without through network, with a process control computer or computer system in the intrinsically safe remote data monitoring system is used for acquiring a data signal from the process control computer or system, and then a local monitoring computer or computer system sends the data signal through network to a remote monitoring computer or computer system for monitoring, wherein said signal collecting device or system is an image or video collecting device, the image or video collecting device converts the data signal into an image or video format file, then the image or video format file is converted into text format data or floating-point format data, and the local monitoring computer or computer system sends the text format data or floating-point format data to the remote monitoring computer or computer system for monitoring through a network data transmission system.

5. The monitoring method in claim 4, wherein the signal collecting device or system is an image or video collecting device, and the image or video collecting device is a camera for shooting data video image shown on a display of the process control computer or computer system, or a video collecting device for acquiring a data signal from a display of the process control computer or computer system.

6. The monitoring method in claim 4, wherein the image or video format file is converted into text format data or floating-point data by recognizing characters and numbers by means of an Optical Character Recognition (OCR) technique, and consequently the image or video format file of data is converted into text format data or floating-point format data.

7. The monitoring method in claim 4, wherein the image or video collecting device converts the data signal into floating-point format data, and then the local monitoring computer or computer system sends the floating-point format data to the remote monitoring computer or computer system for monitoring through a network data transmission system.

8. The monitoring method in claim 7, wherein monitored data acquired from the process control computer or computer system has to be shown on the display of the process control computer or computer system, the monitored data is shown by one of the following steps: directly showing the monitored data in the form of floating-point number, or showing the monitored data on the display of the processing computer or computer system through certain mapping transformation, and then a reverse transformation is performed after finishing optical character recognition to revert into original data.

9. The monitoring method in claim 8, wherein a decimal point of the monitored data acquired from the process control computer or computer system is substituted by other characters, in order to avoid a situation where an Optical Character Recognition (OCR) program misidentifies the decimal point as a polluted "dirty point" and refuses to recognize it, the substitute character is reverted to the decimal point only after the OCR recognition program recognizes it.

10. The monitoring method in claim 8, wherein there are various kinds of mapping transformation, the mapping transformation is designed according to actual demand, the monitored data is expressed in 64-digit binary system or in binary system adopting other digits according to demand, and then correspond 64 pixels on a position in the display of the processing computer or computer system to 64 binary numbers, for each pixel, white color or RGB value for a specified color represents 1, black color or another RGB value for a specified color represents 0, the local monitoring computer or computer system gives a binary expression of the monitored data according to the specified color after acquiring the 64 pixels on that position, and then revert the binary expression to a normal decimal floating-point number.

11. The monitoring method in claim 4, wherein the monitored data acquired from the process control computer or computer system is directly modulated to a video signal, and the local monitoring computer or computer system demodulates the video signal to revert it to the monitored data after receiving it.

* * * * *